J. P. MONGAN.
PISTON RING.
APPLICATION FILED FEB. 26, 1917.

1,251,807.

Patented Jan. 1, 1918.

Witnesses.
A. H. Opsahl
E. E. Wells

Inventor.
John P. Mongan
By his Attorneys.
Williamson & Merchant

UNITED STATES PATENT OFFICE.

JOHN P. MONGAN, OF MINNEAPOLIS, MINNESOTA, ASSIGNOR OF ONE-HALF TO GEORGE H. SCHINDELDECKER, JR., OF ST. PAUL, MINNESOTA.

PISTON-RING.

1,251,807.

Specification of Letters Patent.

Patented Jan. 1, 1918.

Application filed February 26, 1917. Serial No. 150,961.

*To all whom it may concern:*

Be it known that I, JOHN P. MONGAN, a citizen of the United States, residing at Minneapolis, in the county of Hennepin and State of Minnesota, have invented certain new and useful Improvements in Piston-Rings; and I do hereby declare the following to be a full, clear, and exact description of the invention, such as will enable others skilled in the art to which it appertains to make and use the same.

My invention has for its object to provide an improved piston ring; and, to this end, it consists of the novel devices and combinations of devices hereinafter described and defined in the claims.

In the accompanying drawings, which illustrate the invention, like characters indicate like parts throughout the several views.

Referring to the drawings.

Figure 1:
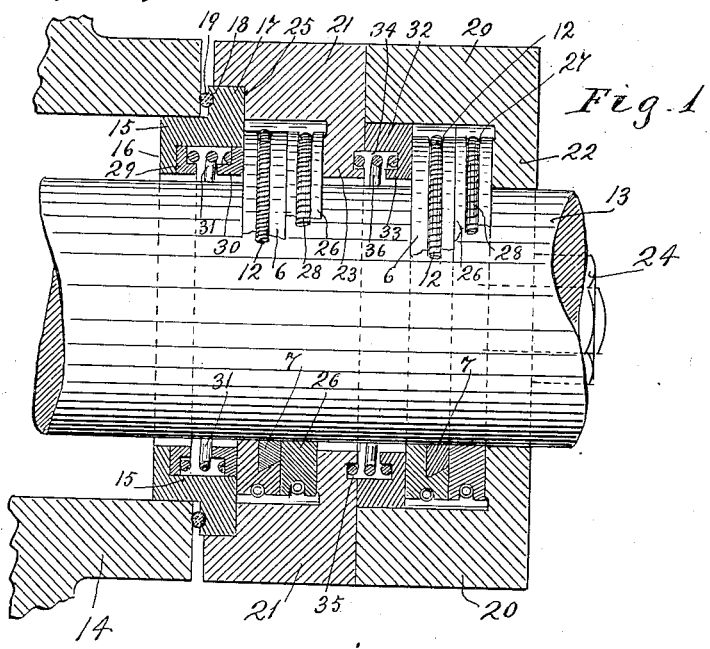
Figure 1 is a view, partly in elevation and partly in central section showing a pair of the improved piston rings arranged to form a steam-tight joint between a piston rod and stuffing box.
Figure 3:
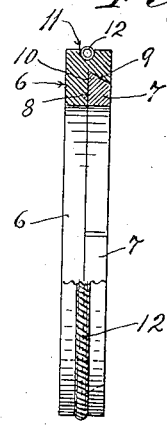
Fig. 3 is a view, partly in elevation and partly in transverse section taken on the line 3—3 of Fig. 2.

The main piston ring involves a main ring section 6 and a supplemental ring section 7, the former having a reduced portion 8 into which the latter is fitted. The main ring section 6 is the full width of the completed piston ring and the two ring sections 6 and 7, when put together, as shown in the drawings, have the same internal diameter. Each of the piston ring sections is transversely divided to separate the same into a plurality of segments, as shown four. A beveled undercut annular groove 9 is formed in the main ring section 6 to receive the beveled periphery 10 of the supplemental ring section 7. The beveled engagement between the two ring sections 6 and 7 is such that, under a contracting movement of the main ring section 6, the same will contract the supplemental ring section 7 and thereby draw said two ring sections into close contact, the one with the other, to form a steam-tight joint therebetween. A peripheral groove 11 is formed in the main ring section 6 to receive an endless coiled spring 12, which tends to contract the main ring section 6, and hence, the supplemental ring section 7, under the action of the beveled engagement therebetween.

In the drawing, there is shown a pair of the improved piston rings arranged to form a steam-tight joint between a piston rod 13 and a stuffing box 14 on a cylinder, not shown. Telescoped into the stuffing box 14, is a gland 15, having at its inner end an internal annular flange 16 and having at its outer end an external annular flange 17. In the inner face of the flange 17, is an annular seat 18 in which is mounted a compressible packing 19 in the form of a ring, which bears directly against the stuffing box 14 and flange 17 to form a steam-tight joint therebetween. Inner and outer rings 20 and 21, respectively, are telescoped onto the piston rod 13 and each thereof is provided at its outer end with an internal annular flange 22 and 23, respectively. A pair of diametrically opposite nut-equipped studs 24, anchored in the stuffing box 14 and extending through alined perforations in the rings 20 and 21, is provided for drawing said rings and gland 15 together and compressing the packing 19 in the customary manner.

The inner end of the ring 20 is internally reduced to form an annular seat 25 for the flange 17 of the gland 15. Within each ring 20 and 21 and the piston rod 13, is a sectional packing ring 26 and one of the improved piston rings 6—7. A peripheral groove 27 is formed in each packing ring 26 to receive and hold an endless coiled spring 28, which yieldingly draws the sections of said packing ring onto the piston rod 13. The outer faces of the packing rings 26 bear directly, the one against the inner face of the flange 22 and the other against the inner face of the flange 23. One of the improved piston rings 6—7 bears directly against the inner face of each packing ring 26. Telescoped into the gland 15, is a seat-forming ring 29 and a follower 30 seated, the former against the inner face of the flange 16 as a base of resistance, and the latter against the adjacent piston ring 6—7. Both the ring 29 and follower 30 are L-shaped in cross section and have compressed therebetween a coiled spring 31. Obviously, this coiled spring 31 yieldingly presses the piston ring 6—7 onto the packing ring 26 which, in turn, is pressed onto the flange 23.

Figure 2:
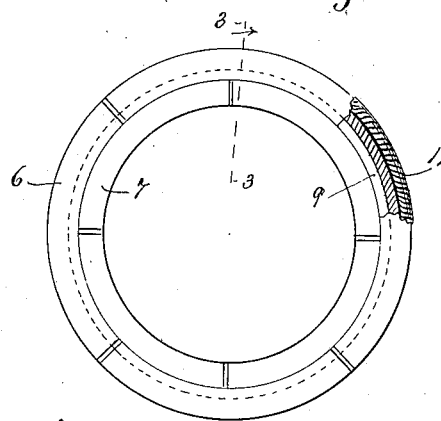
Fig. 2 is a side elevation of the improved piston ring with some parts broken away and with some parts sectioned.
Figure 5:
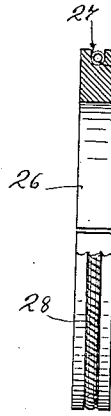
Fig. 5 is a view, partly in elevation and partly in section taken on the line 5—5 of Fig. 4.
Figure 4:
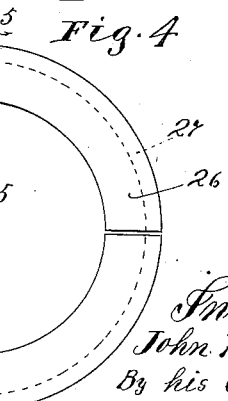
Fig. 4 is a side view of a sectional packing ring.

Telescoped into the inner end of the ring 22, is a follower 32 having at its outer end an internal flange 33, in the inner face of which is formed an annular seat 34. An annular seat 35 is also formed in the outer face of the flange 23 and a coiled spring 36 is mounted in said seats 34 and 35. This coiled spring 36 reacts against the flange 33 as a base of resistance and, through the follower 32, yieldingly presses the adjacent piston ring 6—7 onto the packing ring 26, which, in turn, is yieldingly held against the inner face of the flange 22. In assembling the members of each piston ring, the joints between the several sections thereof are broken, as shown in Fig. 2. By reference to Fig. 1, it will be noted that the inner faces of the flanges 22 and 23 are raised, the raised portion having a diameter slightly less than the diameter of the packing ring 26 to prevent the same from wearing into each other.

What I claim is:—

1. A piston ring made up of a main ring section and a supplemental ring section fitted, the latter into the former, and each comprising a plurality of segments, said two ring sections having the same internal diameter and the supplemental ring section having beveled engagement with the main ring section, whereby a contracting movement of the main ring section will contract said supplemental ring section and draw the same laterally onto the main ring section, and yielding means tending to contract the main ring section.

2. A piston ring made up of a main ring section and a supplemental ring section fitted, the latter into the former, and each comprising a plurality of segments, said two ring sections having the same internal diameter and the supplemental ring section having beveled engagement with the ring section, whereby a contracting movement of the main ring section will contract said supplemental ring section and draw the same laterally onto the main ring section, and yielding means tending to contract the main ring section, the joints in one of said ring sections being circumferentially offset with respect to the joints in the other of said ring sections.

3. A piston ring made up of a main ring section and a supplemental ring section fitted, the latter into the former, and each comprising a plurality of segments, said two ring sections having the same internal diameter and the supplemental ring section having beveled engagement with the main ring section, whereby a contracting movement of the main ring section will contract said supplemental ring section and draw the same laterally onto the main ring section, yielding means tending to contract the main ring section, and a packing ring seated against said piston ring and covering the circumferential joint between the two sections thereof.

4. A piston ring made up of a main ring section having a reduced portion with an undercut beveled annular groove, a supplemental ring section seated in the reduced portion of the main ring section, each of said ring sections comprising a plurality of segments with the joints in one of said ring sections circumferentially offset with respect to the joints in the other of said ring sections, said two ring sections having the same internal diameter and said supplemental ring section having a beveled periphery seated in the annular groove of the main ring section, the beveled engagement between said two ring sections tending, under a contracting movement of the main ring section, to contract the supplemental ring section and draw the same laterally onto the main ring section, and yielding means tending to contract the main ring section.

5. A piston ring made up of a main ring section and a supplemental ring section fitted, the latter into the former, and each comprising a plurality of segments, said two ring sections having the same internal diameter and the supplemental ring section having beveled engagement with the main ring section, whereby a contracting movement of the main ring section will contract said supplemental ring section and draw the same laterally onto the main ring section, yielding means tending to contract the main ring section, a packing ring seated against said piston ring and covering the circumferential joint between the two sections thereof, and means for yieldingly pressing the piston ring and packing ring together.

In testimony whereof I affix my signature in presence of two witnesses.

JOHN P. MONGAN.

Witnesses:
E. C. WELLS,
HARRY D. KILGORE.